(12) United States Patent
Du et al.

(10) Patent No.: US 11,109,047 B2
(45) Date of Patent: *Aug. 31, 2021

(54) SYSTEMS AND METHODS FOR MULTIMEDIA SIGNAL PROCESSING AND TRANSMISSION

(71) Applicant: ZHEJIANG XINSHENG ELECTRONIC TECHNOLOGY CO., LTD., Zhejiang (CN)

(72) Inventors: Zhaosheng Du, Hangzhou (CN); Genqiang Cui, Hangzhou (CN); Bingyun Lyu, Hangzhou (CN); Wei Fang, Hangzhou (CN)

(73) Assignee: ZHEJIANG XINSHENG ELECTRONIC TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,031

(22) Filed: Apr. 16, 2020

(65) Prior Publication Data

US 2020/0244977 A1  Jul. 30, 2020

Related U.S. Application Data

(63) Continuation of application No. PCT/CN2018/111362, filed on Oct. 23, 2018.

(30) Foreign Application Priority Data

Oct. 23, 2017  (CN) .......................... 201710992714.9

(51) Int. Cl.
*H04N 19/436* (2014.01)
*H04N 5/04* (2006.01)
(Continued)

(52) U.S. Cl.
CPC ......... *H04N 19/436* (2014.11); *H04L 65/601* (2013.01); *H04L 65/607* (2013.01);
(Continued)

(58) Field of Classification Search
USPC ...................................................... 375/240.01
See application file for complete search history.

(56) References Cited

U.S. PATENT DOCUMENTS

| 4,191,969 A | 3/1980 | Briand et al. |
| 8,422,518 B2 | 4/2013 | Guan et al. |

(Continued)

FOREIGN PATENT DOCUMENTS

| CN | 102301730 A | 12/2011 |
| CN | 202190279 U | 4/2012 |

(Continued)

OTHER PUBLICATIONS

Extended European Search Report in European Application No. 18869741.1 dated Sep. 15, 2020, 9 pages.

(Continued)

*Primary Examiner* — Patricia I Young
(74) *Attorney, Agent, or Firm* — Metis IP LLC

(57) ABSTRACT

A method for processing and transmitting multimedia signals received from a plurality of channels are provided. The method may include receiving at least two multimedia signals from a plurality of channels, and generating a composite multimedia digital signal by coding the multimedia signals in a frame format. At least one of the multimedia signals may include a video signal. The frame format may include an active zone and a blanking zone, the active zone may be configured to encode at least part of the multimedia signals, and the blanking zone may be configured to encode format information. The method may further include converting at least part of the encoded multimedia signals in the active zone into analog signals to generate a composite multimedia signal. The method may further include transmitting the composite multimedia signal to a receiving device via a transmission medium.

20 Claims, 12 Drawing Sheets

(51) Int. Cl.

| | | |
|---|---|---|
| *H04N 7/18* | (2006.01) | |
| *H04N 19/103* | (2014.01) | |
| *H04N 19/136* | (2014.01) | |
| *H04N 19/172* | (2014.01) | |
| *H04N 7/04* | (2006.01) | |
| *H04N 7/084* | (2006.01) | |
| *H04N 7/10* | (2006.01) | |
| *H04L 29/06* | (2006.01) | |
| *H04N 5/262* | (2006.01) | |

(52) U.S. Cl.
CPC ............. *H04N 5/2622* (2013.01); *H04N 7/04* (2013.01); *H04N 7/084* (2013.01); *H04N 7/10* (2013.01); *H04N 19/103* (2014.11); *H04N 19/136* (2014.11); *H04N 19/172* (2014.11)

(56) References Cited

U.S. PATENT DOCUMENTS

| | | | |
|---|---|---|---|
| 2006/0020990 A1 | 1/2006 | McEneaney | |
| 2006/0140265 A1 | 6/2006 | Igler et al. | |
| 2010/0046557 A1* | 2/2010 | Guan | H04N 7/083 370/476 |
| 2015/0312507 A1 | 10/2015 | Yin et al. | |
| 2019/0174027 A1* | 6/2019 | Lv | H04J 13/0029 |

FOREIGN PATENT DOCUMENTS

| | | |
|---|---|---|
| CN | 102802039 A | 11/2012 |
| CN | 103152543 A | 8/2013 |
| CN | 102301730 B | 2/2014 |
| CN | 105791752 A | 7/2016 |
| CN | 106604097 A | 4/2017 |
| EP | 2814250 A1 | 12/2014 |
| WO | 2019080826 A9 | 5/2019 |
| WO | 2019080827 A1 | 5/2019 |

OTHER PUBLICATIONS

Extended European Search Report in European Application No. 18869740.3 dated Sep. 21, 2020, 10 pages.

International Search Report in PCT/CN2018/111362 dated Jan. 22, 2019, 4 pages.

Written Opinion in PCT/CN2018/111362 dated Jan. 22, 2019, 6 pages.

International Search Report in PCT/CN2018/111361 dated Jan. 22, 2019, 4 pages.

Written Opinion in PCT/CN2018/111361 dated Jan. 22, 2019, 5 pages.

\* cited by examiner

600

```
┌─────────────────────────────────────────────────────┐
│ Receiving a composite multimedia signal in a frame  │
│ format, the composite multimedia signal being      │── 610
│ generated based on at least two multimedia signals │
│ that are received from a plurality of channels, the │
│ frame format includes an active zone and a blanking │
│ zone, the active zone being configured to encode   │
│ analog signals converted from at least part of the │
│ at least two multimedia signals, and the blanking  │
│ zone is configured to encode format information    │
└─────────────────────────────────────────────────────┘
                           │
                           ▼
┌─────────────────────────────────────────────────────┐
│ Converting the analog signals in the active zone    │── 620
│ into digital signals to generate a composite       │
│ multimedia digital signal                           │
└─────────────────────────────────────────────────────┘
                           │
                           ▼
┌─────────────────────────────────────────────────────┐
│ Demodulating the composite multimedia digital       │── 630
│ signal according to the format information related │
│ to the active zone                                  │
└─────────────────────────────────────────────────────┘
                           │
                           ▼
┌─────────────────────────────────────────────────────┐
│ Transmitting the demodulated composite multimedia   │── 640
│ digital signal to one or more output devices        │
└─────────────────────────────────────────────────────┘
```

FIG. 6

SYSTEMS AND METHODS FOR MULTIMEDIA SIGNAL PROCESSING AND TRANSMISSION

CROSS-REFERENCE TO RELATED APPLICATIONS

This application is a continuation of International Application PCT/CN2018/111362, filed on Oct. 23, 2018, which claims priority of Chinese Patent Application No. 201710992714.9 filed on Oct. 23, 2017, the entire content of which is incorporated herein by reference.

TECHNICAL FIELD

The present disclosure generally relates to systems and methods for processing multimedia signals, and in particular, to systems and methods for processing and transmitting multimedia signals received from a plurality of channels.

BACKGROUND

Multimedia technology has been widely used in various fields in recent years, such as computer industry, entertainment, and video monitoring. A challenge in multimedia technology is the processing and transmission of multimedia signals received from a plurality of channels. Normally, a plurality of transmission medium (e.g., a plurality of cables) is needed to transmit the multimedia signals received from the plurality of channels, which may cause a waste of transmission resources. Accordingly, it is desirable to provide systems and methods for processing and transmitting multimedia signals received from a plurality of channels more efficiently, thus saving the transmission cost.

SUMMARY

In one aspect of the present disclosure, a method for processing and transmitting multimedia signals received from a plurality of channels is provided. The method may be implemented on a computing device which has at least one processor and at least one computer-readable storage medium. The method may include one or more of the following operations. At least two multimedia signals may be received from a plurality of channels. At least one of the at least two multimedia signals may include a video signal. A composite multimedia digital signal may be generated by coding the at least two multimedia signals in a frame format. The frame format may include an active zone and a blanking zone, the active zone may be configured to encode at least part of the at least two multimedia signals, and the blanking zone may be configured to encode format information. At least part of the encoded multimedia signals in the active zone may be converted into analog signals to generate a composite multimedia signal. The composite multimedia signal may be transmitted to a receiving device via a transmission medium.

In some embodiments, the active zone may be configured to encode the video signal, and the converting the at least part of the at least two multimedia signals in the active zone into analog signals may include converting the video signal in the active zone into analog signals.

In some embodiments, the active zone of the frame format may include a plurality of active lines configured to encode the video signal, and a horizontal blanking zone between at least one pair of adjacent active lines of the plurality of active lines. The horizontal blanking may include a horizontal synchronization signal.

In some embodiments, each of the at least two multimedia signals may include a video signal, and the format information may indicate a combination form of the video signals in the plurality of active lines in the active zone.

In some embodiments, the generating the composite multimedia digital signal by coding the at least two multimedia signals in the frame format may include one or more of the following operations. The video signals may be encoded into the plurality of active lines according to the format information. A separator may be inserted between at least one pair of adjacent video signals in at least one of the plurality of active lines.

In some embodiments, the horizontal synchronization signal and the separator may have different time widths.

In some embodiments, the active zone may include a horizontal blanking zone corresponding to each of the plurality of active lines. Each of the at least two multimedia signals may include an audio signal. The generating the composite multimedia digital signal may include one or more of the following operations. For each of the plurality of active lines in the active zone, a combination of the audio signals may be determined according to the combination form of the video signals in the active line. For each of the plurality of active lines in the active zone, the combination of the audio signals may be encoded into the horizontal blanking zone corresponding to the active line.

In some embodiments, at least one of the at least two multimedia signals may include an audio signal, and the generating the composite multimedia digital signal may include encoding the audio signal into the horizontal blanking zone.

In some embodiments, the size of the blanking zone of the frame format may be smaller than 10 bytes.

In some embodiments, the transmission medium may be a coaxial cable.

In some embodiments, the method may further include converting the analog signals of the composite multimedia signal into digital signals.

In some embodiments, each of the at least two multimedia signals may include at least one of a horizontal synchronization signal or a frame synchronization signal, and the generating the composite multimedia digital signal by coding the at least two multimedia signals may include one or more of the following operations. The at least one of the horizontal synchronization signal or the frame synchronization signal in each multimedia signal may be detected. Valid data from the at least two multimedia signals may be extracted based on the detected at least one of the horizontal synchronization signal or the frame synchronization signal in each multimedia signal. The composite multimedia digital signal may be generated by coding the valid data.

In yet another aspect of the present disclosure, a method for processing and transmitting multimedia signals received from a plurality of channels is provided. The method may be implemented on a computing device which has at least one processor and at least one computer-readable storage medium. The method may include one or more of the following operations. A composite multimedia signal in a frame format may be received. The composite multimedia signal may be generated based on at least two multimedia signals that are received from a plurality of channels. The at least one of the at least two multimedia signals may include a video signal. The frame format may include an active zone and a blanking zone, the active zone may be configured to encode analog signals converted from at least part of the at least two multimedia signals, and the blanking zone may be configured to encode format information. The composite multimedia signal may be demodulated according to the format information. The demodulated composite multimedia signal may be transmitted to one or more output devices. The demodulating the composite multimedia signal according to the format information may include converting the analog signals in the active zone into digital signals.

In some embodiments, the transmitting the demodulated composite multimedia digital signal to one or more output devices may include one or more of the following operations. The at least two multimedia signals may be determined from the demodulated composite multimedia digital signal. Each of the at least two multimedia signals may be transmitted to a distinctive output device.

In yet another aspect of the present disclosure, a system for processing and transmitting multimedia signals received from a plurality of channels is provided. The system may include a storage device storing a set of instructions, and at least one processor in communication with the storage device. When executing the set of instructions, the at least one processor may be configured to cause the system to execute one or more of the following operations. At least two multimedia signals may be received from a plurality of channels. At least one of the at least two multimedia signals may include a video signal. A composite multimedia digital signal may be generated by coding the at least two multimedia signals in a frame format. The frame format may include an active zone and a blanking zone, the active zone may be configured to encode at least part of the at least two multimedia signals, and the blanking zone may be configured to encode format information. At least part of the encoded multimedia signals in the active zone may be converted into analog signals to generate a composite multimedia signal. The composite multimedia signal may be transmitted to a receiving device via a transmission medium.

In yet another aspect of the present disclosure, a system for processing and transmitting multimedia signals received from a plurality of channels is provided. The system may include a storage device storing a set of instructions, and at least one processor in communication with the storage device. When executing the set of instructions, the at least one processor may be configured to cause the system to execute one or more of the following operations. A composite multimedia signal in a frame format may be received. The composite multimedia signal may be generated based on at least two multimedia signals that are received from a plurality of channels. The at least one of the at least two multimedia signals may include a video signal. The frame format may include an active zone and a blanking zone, the active zone may be configured to encode analog signals converted from at least part of the at least two multimedia signals, and the blanking zone may be configured to encode format information. The composite multimedia signal may be demodulated according to the format information. The demodulated composite multimedia signal may be transmitted to one or more output devices. The demodulating the composite multimedia signal according to the format information may include converting the analog signals in the active zone into digital signals.

In yet another aspect of the present disclosure, a non-transitory computer readable medium is provided. The non-transitory computer readable medium storing instructions, the instructions, when executed by at least one processor of a system, may cause the system to implement a method. The method may include one or more of the following operations. At least two multimedia signals may be received from a plurality of channels. At least one of the at least two multimedia signals may include a video signal. A composite multimedia digital signal may be generated by coding the at least two multimedia signals in a frame format. The frame format may include an active zone and a blanking zone, the active zone may be configured to encode at least part of the at least two multimedia signals, and the blanking zone may be configured to encode format information. At least part of the encoded multimedia signals in the active zone may be converted into analog signals to generate a composite multimedia signal. The composite multimedia signal may be transmitted to a receiving device via a transmission medium.

In yet another aspect of the present disclosure, a non-transitory computer readable medium is provided. The non-transitory computer readable medium storing instructions, the instructions, when executed by at least one processor of a system, may cause the system to implement a method. The method may include one or more of the following operations. A composite multimedia signal in a frame format may be received. The composite multimedia signal may be generated based on at least two multimedia signals that are received from a plurality of channels. The at least one of the at least two multimedia signals may include a video signal. The frame format may include an active zone and a blanking zone, the active zone may be configured to encode analog signals converted from at least part of the at least two multimedia signals, and the blanking zone may be configured to encode format information. The composite multimedia signal may be demodulated according to the format information. The demodulated composite multimedia signal may be transmitted to one or more output devices. The demodulating the composite multimedia signal according to the format information may include converting the analog signals in the active zone into digital signals.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for processing a composite multimedia signal according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
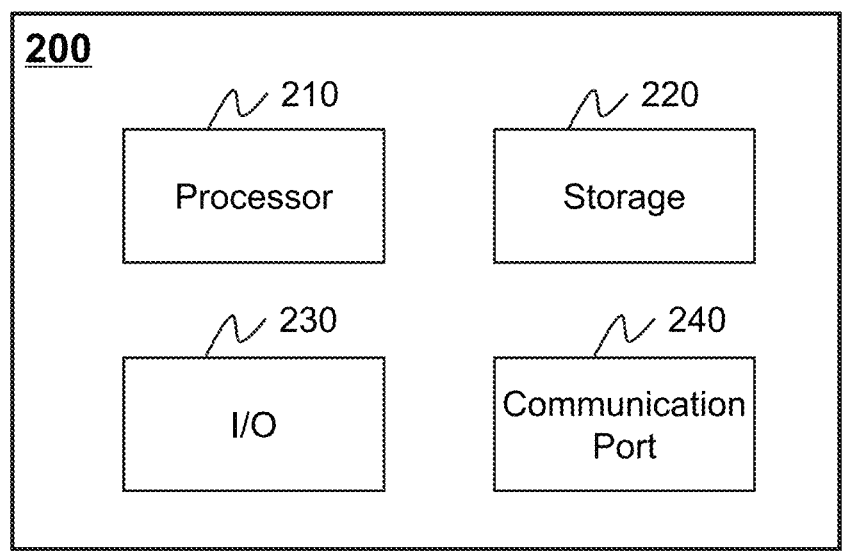
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The term "multimedia" may refer to a means or tool for storing and delivering information that uses one content form or a combination of different content forms, such as but not limited to text, an audio, an image, an animation, a video, an interactive content, or the like, or any combination thereof. The term "multimedia signal" may refer to a signal in any signal form (e.g., a digital signal, an analog signal, a combination of digital signal and analog signal) that encodes multimedia content. The term "composite multimedia digital signal" may refer to a digital signal that combines two or more multimedia signals. The term "composite multimedia signal" may refer to an analog signal or a mixed signal of digital signals and analog signals that combines two or more multimedia signals.

An aspect of the present disclosure relates to systems and methods for processing and transmitting a plurality of multimedia signals received from a plurality of channels. The systems and methods may generate a composite multimedia digital signal by coding the multimedia signals in a frame format. The frame format may include an active zone configured to encode at least part of the multimedia signals and a blanking zone configured to encode format information. The systems and methods may covert at least a portion of the encoded multimedia signals in the active zone into analog signals to generate a composite multimedia signal. Compared with the original multimedia signals which may be transmitted via a plurality of transmission medium, the composite multimedia signal may be transmitted via a single transmission medium. In addition, the composite multimedia signal, as a mixed signal of digital signals and analog signals, may be more suitable for long-distance transmission than the composite multimedia digital signal. As such, the multimedia signals may be transmitted in a more efficient and economic manner.

Figure 1:
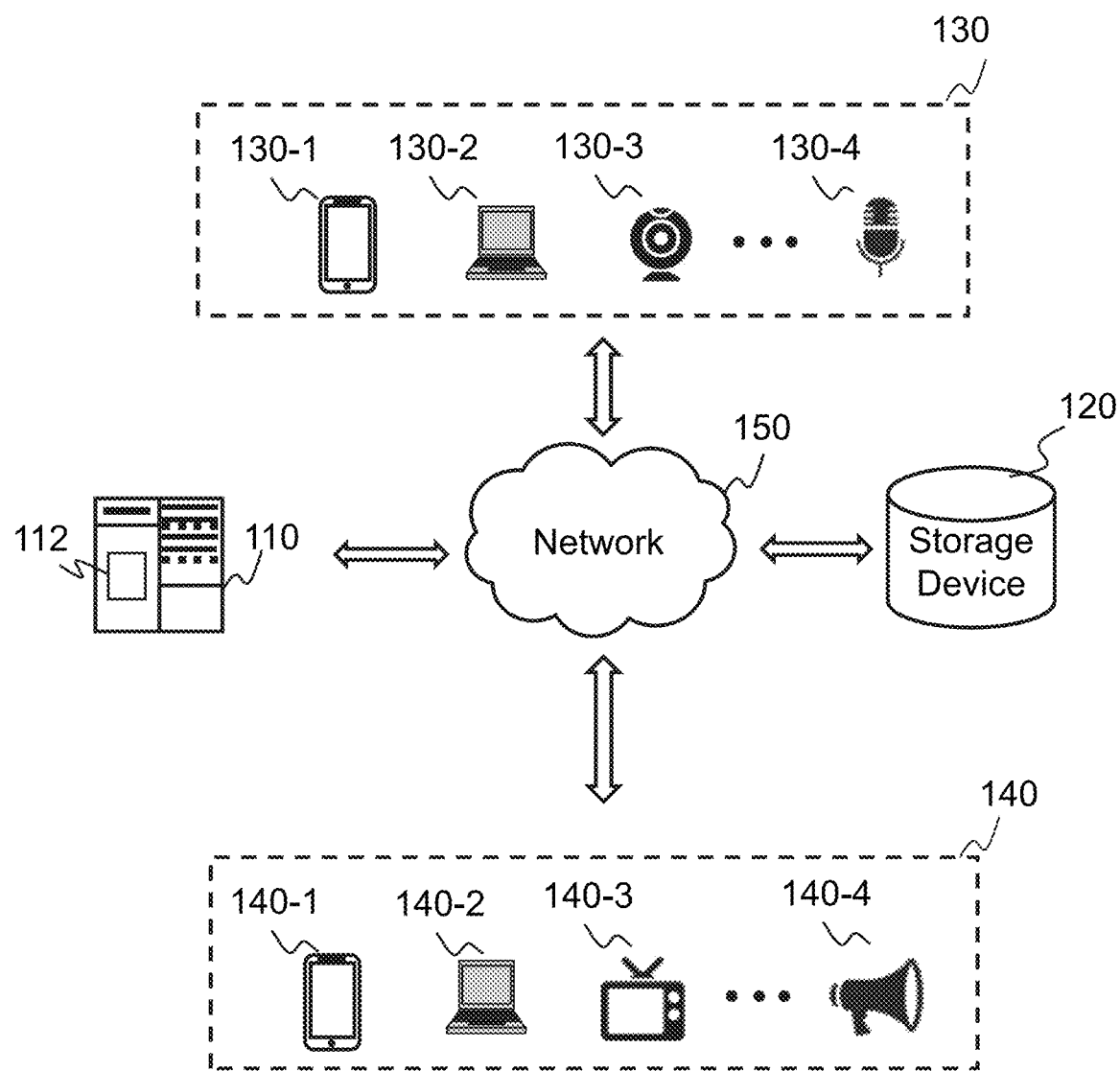
FIG. 1 is a schematic diagram illustrating an exemplary multimedia system according to some embodiments of the present disclosure.

FIG. 1 illustrates a schematic diagram of an exemplary multimedia system 100 according to some embodiments of the present disclosure. As shown, the multimedia system 100 may include a server 110, a storage device 120, an acquisition device 130, an output device 140, and a network 150.

The server 110 may process information and/or data relating to the multimedia system 100 to perform one or more functions described in the present disclosure. In some embodiments, the server 110 may include one or more processing engines 112 (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server 110 may be a single server or a server group. The server group may be centralized, or distributed (e.g., server 110 may be a distributed system). In some embodiments, the server 110 may be local or remote. For example, the server 110 may access information and/or data stored in the acquisition device 130, and/or the storage device 120 via the network 150. As another example, the server 110 may be directly connected to the acquisition device 130, and/or the storage device 120 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 of the present disclosure.

The storage device 120 may store data and/or instructions. The data and/or instructions may be obtained from, for example, the server 110, the acquisition device 130, and/or any other component of the multimedia system 100.

In some embodiments, the storage device 120 may store data and/or instructions that the server 110 may execute or use to perform exemplary methods described in the present disclosure. For example, the storage device 120 may store multimedia signals acquired by one or more acquisition devices 130. As another example, the storage device 120 may store a composite multimedia (digital) signal generated based on the multimedia signals. In some embodiments, the storage device 120 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to the network 150 to communicate with one or more components of the multimedia system 100 (e.g., the server 110, the acquisition device 130). One or more components of the multimedia system 100 may access the data or instructions stored in the storage device 120 via the network 150. In some embodiments, the storage device 120 may be directly connected to or communicate with one or more components of the multimedia system 100 (e.g., the server 110, the acquisition device 130). In some embodiments, the storage device 120 may be part of another component of the multimedia system 100, such as the server 110, the acquisition device 130, or the output device 140.

In some embodiments, one or more components of the multimedia system 100 (e.g., the server 110, the acquisition device 130) may have a permission to access the storage device 120. For example, the server 110 or the acquisition device 130 may read and/or modify the format of a composite multimedia digital signal stored in the storage device 120.

The acquisition device 130 may be and/or include any suitable device that is capable of acquiring a multimedia signal. Exemplary acquisition devices may include a camera (e.g., a digital camera, an analog camera, an IP camera (IPC)), a video recorder, a scanner, a mobile phone, a tablet computing device, a wearable computing device, a monitoring equipment, an infrared imaging device (e.g., a thermal imaging device), a microphone, or the like. In some embodiments, the acquisition device 130 may include a mobile phone 130-1, a computer 130-2, a surveillance camera 130-3, a microphone 130-4, etc. The computer 130-2 may include but not limit to a laptop, a tablet computer, a desktop, or the like, or any combination thereof. The surveillance camera 130-3 may include but not limit to a gun camera, a dome camera, an integrated camera, a monocular camera, a binocular camera, a multi-view camera, or the like, or any combination thereof. The multimedia signal acquired by the acquisition device 130 may include a video signal, an audio signal, an image signal, a text signal, an animation signal, or the like, or any combination thereof. In some embodiments, the acquisition device 130 may include a plurality of components each of which can acquire a multimedia signal. For example, the acquisition device 130 may include a plurality of sub-cameras that can take pictures or videos simultaneously. As another example, the acquisition device 130 may include a camera and a microphone.

The output device 140 may be and/or include any suitable device that can display or output information in a human-readable form, such as text, image, audio, video, graph, animation, or the like, or any combination thereof. Exemplary output devices may include a mobile device 140-1, a computer 140-2, a display device 140-3, a loudspeaker 140-4, a headset, a microphone, a music player, an e-book reader, a printer, a projector, or the like, or a combination thereof. The mobile device 140-1 may include a mobile phone, a personal digital assistant (PDA), or the like. The computer 140-2 may include a laptop, a tablet computer, a desktop, or the like. The display device 140-3 may include a cathode ray tube (CRT) display, a liquid crystal display (LCD), a light emitting diode (LED) display, a plasma display panel (PDP), a 3D display, or the like. In some embodiments, the output device 140 may be connected to one or more components of the multimedia system 100 (e.g., the server 110, the storage device 120, the acquisition device 130) via the network 150, such as a wireless network or a wired network (e.g., a coaxial cable network).

The network 150 may include any suitable network that can facilitate exchange of information and/or data for the multimedia system 100. In some embodiments, one or more components in the multimedia system 100 (e.g., the server 110, the storage device 120, and the acquisition device 130) may send information and/or data to another component(s) in the multimedia system 100 via the network 150. For example, the server 110 may obtain/acquire multimedia signals from the acquisition device 130 via the network 150. In some embodiments, the network 150 may be any type of wired or wireless network, or combination thereof. Merely by way of example, the network 150 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

In some embodiments, the multimedia system 100 may include a receiving device (not shown in the FIG. 1). The receiving device may receive information and/or signals from one or more components in the multimedia system 100 (e.g., the server 110, the acquisition device 130) via the network 150. The receiving device may further process the information and/or signals and transmit the processed information and/or signals to the output device for display. Merely by way of example, the receiving device may receive a composite multimedia signal from, for example, the server 110. The receiving device may demodulate the composite multimedia signal, and transmit the demodulated composite multimedia signal to one or more output devices 140 for display. In some embodiments, the receiving device may be part of the server 110 or the output device 140. Details regarding the receiving device may be found elsewhere in the present disclosure (e.g., FIGS. 5 and 6 and the relevant descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. For example, the multimedia system 100 may include one or more terminals (e.g., a console) configured to receive a user input. As another example, the processing engine 112 may be integrated into the acquisition device 130. However, those variations and modifications do not depart from the scope of the present disclosure.

FIG. 2 is a schematic diagram illustrating exemplary hardware and/or software components of an exemplary computing device 200 on which the processing engine 112, the receiving device, and/or the output device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 112 in accordance with techniques described herein. The computer instructions may include, for example, routines, programs, objects, components, data structures, procedures, modules, and functions, which perform particular functions described herein. For example, the processor 210 may process multimedia signals obtained from the acquisition device 130, the storage device 120, and/or any other component of the multimedia system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the server 110, the acquisition device 130, the storage device 120, and/or any other component of the multimedia system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input and/or output signals, data, information, etc. In some embodiments, the I/O 230 may enable a user interaction with the processing engine 112. In some embodiments, the I/O 230 may include an input component and an output component. Examples of the input component may include a keyboard, a mouse, a touch screen, a microphone, or the like, or a combination thereof. Examples of the output component may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 150) to facilitate data communications. The communication port 240 may establish connections between the processing engine 112 and the server 110, the acquisition device 130, the output device 140, and/or the storage device 120. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with analog signal transmission.

Figure 3:
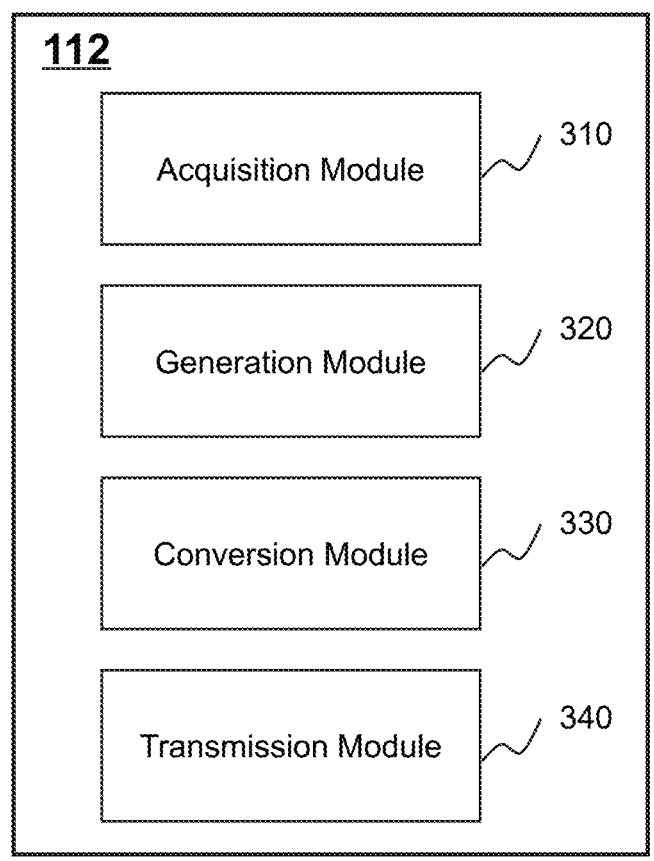
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an acquisition module 310, a generation module 320, a conversion module 430, and a transmission module 340.

The acquisition module 310 may be configured to obtain information related to the multimedia system 100. For example, the acquisition module 310 may obtain at least two multimedia signals from a plurality of channels. Each of the at least two multimedia signals may be received from one of the plurality of channels. The at least two multimedia signals (also be referred to as the multimedia signals for brevity) may be of the same type or different types of multimedia signals. For example, the multimedia signals may include a video signal, an audio signal, a combined signal of video signal and audio signal, an image signal, an animation signal, or the like, or a combination thereof. More descriptions regarding the multimedia signals may be found elsewhere in the present disclosure (e.g., operation 410 in FIG. 4A and the relevant descriptions).

The generation module 320 may be configured to generate a composite multimedia digital signal based on the multimedia signals obtained by the acquisition module 310. In some embodiments, the generation module 320 may generate the composite multimedia digital signal by coding the multimedia signals in a frame format. The frame format may include an active zone and a blanking zone. The active zone may be used to encode at least part of the multimedia signals. The blanking zone may be used to encode format information. More descriptions regarding the generation of the composite multimedia digital signal may be found elsewhere in the present disclosure (e.g., operation 420 in FIG. 4A, FIG. 4B and the relevant descriptions thereof).

The conversion module 330 may be configured to convert at least part of the encoded multimedia signals in the active zone of the composite multimedia digital signal into analog signals. The converted composite multimedia digital signal may be a mixed signal of digital signals and analog signals, and be referred to as a composite multimedia signal. More descriptions regarding the conversion of the composite multimedia digital signal may be found elsewhere in the present disclosure (e.g., operation 430 in FIG. 4A and the relevant descriptions thereof).

The transmission module 340 may be configured to transmit the composite multimedia signal to a receiving device via a transmission medium. The transmission medium may include any transmission medium that can transmit analog signals and digital signals, such as a coaxial cable, a twisted pair cable, an optical fiber, or the like, or any combination thereof. More descriptions regarding the transmission of the composite multimedia signal may be found elsewhere in the present disclosure (e.g., operation 440 in FIG. 4A and the relevant descriptions thereof).

It should be noted that the above descriptions of the processing engine 112 are merely provided for the purposes of illustration, and not intended to limit the scope of the present disclosure. For persons having ordinary skills in the art, various modifications and changes in the forms and details of the application of the above method and system may occur without departing from the principles of the present disclosure. For example, the generation module 320 and the conversion module 330 may be integrated into a module configured to generate the composite multimedia signal based on the multimedia signals. However, those variations and modifications also fall within the scope of the present disclosure.

Figure 4A:
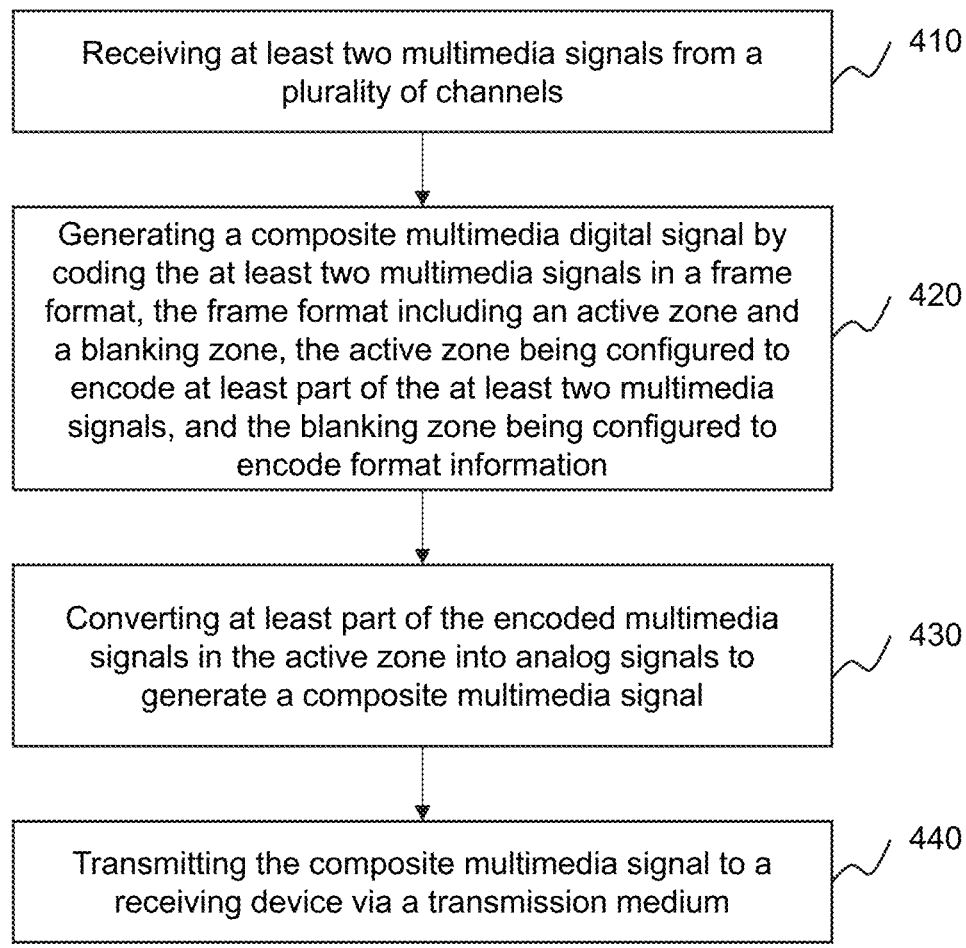
FIG. 4A is a flowchart illustrating an exemplary process for generating and transmitting a composite multimedia signal according to some embodiments of the present disclosure.

FIG. 4A is a flowchart illustrating an exemplary process 400A for generating and transmitting a composite multimedia signal according to some embodiments of the present disclosure. In some embodiments, one or more operations in the process 400A may be implemented in the multimedia system 100 illustrated in FIG. 1. In some embodiments, one or more operations in the process 400A may be stored in a storage device (e.g., the storage device 120, the storage 220) as a form of instructions, and invoked and/or executed by the server 110 (e.g., the processing engine 112 of the server 110, or the processor 210 of the computing device 200).

In 410, the acquisition module 310 may receive at least two multimedia signals from a plurality of channels. Each of the at least two multimedia signals may be received from one of the plurality of channels.

The at least two multimedia signals (also be referred to as the multimedia signals for brevity) may be of the same type or different types of multimedia signals. For example, the multimedia signals may include a video signal, an audio signal, a combined signal of video signal and audio signal, an image signal, an animation signal, or the like, or a combination thereof. In some embodiments, each of the multimedia signals may include a video signal and/or an audio signal. In some embodiments, the multimedia signals may be of any signal form, such as a digital signal, an analog signal, or a combined signal of digital signal and analog signal. Different multimedia signals may be of the same signal form or different signal forms.

In some embodiments, a channel may correspond to an acquisition device 130 or an acquisition component of the acquisition device 130 from which a multimedia signal is received. For example, the multimedia signals may be received from different acquisition devices 130 (e.g., different surveillance cameras with different monitor areas). As another example, two or more of the multimedia signals may be received from different acquisition components of one acquisition device 130 (e.g., different cameras of a multi-view camera). As used herein, if two multimedia signals are received from two acquisition components of an acquisition device 130, the two multimedia signals may be regarded as being received from two channels.

In some embodiments, at least one of the multimedia signals may include a video signal. The video signal may be received from an acquisition device 130 that include a video signal acquisition unit. In some embodiments, at least one of the multimedia signals may include an audio signal. The audio signal may be received from an acquisition device 130 that includes an audio signal acquisition unit.

In 420, the generation module 320 may generate a composite multimedia digital signal by coding the at least two multimedia signals in a frame format.

The composite multimedia digital signal in the frame format may include one or more frames. The frame format of a frame may include an active zone and a blanking zone. The active zone may be used to encode at least part of the multimedia signals. The active zones of different frames may encode the same multimedia signal(s) or different multimedia signals. For illustration purposes, an active zone that encodes all the multimedia signals obtained in operation 410 is described as an example. It should be noted that the embodiments of the present disclosure, with minor modifications known by a person skilled in the art, can be applied to an active zone that encodes a portion of the multimedia signals obtained in operation 410. The blanking zone may be used to encode format information. In some embodiments, the format information may be related to the format of the frame, the active zone, and/or the blanking zone. Details regarding the frame format of a frame may be found elsewhere in the present disclosure (e.g., FIG. 4B and the relevant descriptions thereof).

The composite multimedia digital signal may be a digital signal. In some embodiments, the multimedia signals received in operation 410 may all be digital signals. The composite multimedia digital signal may be directly generated by coding the digital signals of the multimedia signals. Alternatively, a portion or all of the multimedia signals received in operation 410 may be analog signal(s). The generation module 320 may first convert the analog signal(s) into digital signal(s), and then generate the composite multimedia digital signal by coding the converted multimedia signal(s) and the original digital multimedia signal(s) (if any).

In 430, the conversion module 330 may convert at least part of the encoded multimedia signals in the active zone of the composite multimedia digital signal into analog signals. The converted composite multimedia digital signal may be a mixed signal of digital signals and analog signals, and be referred to as a composite multimedia signal.

In some embodiments, one or more of the multimedia signals may include a video signal, the conversion module 330 may convert the portion of the composite multimedia digital signal which corresponds to the video signal(s) into analog signals. In some embodiments, one or more of the multimedia signals may include a video signal and an audio signal, the conversion module 330 may convert the portion of the composite multimedia digital signal which corresponds to the video signal(s) and the audio signal(s) into analog signal. For brevity, the portion of the composite multimedia digital signal which corresponds to the video/audio signal may be referred to as the video/audio signal. In some embodiments, the conversion module 330 may instruct a digital-to-analog converter (DAC) or any other device for digital-analog conversion to perform the digital-analog conversion.

Compared with the composite multimedia digital signal, the composite multimedia signal may be more suitable for long-distance (e.g., longer than a predetermined distance) transmission. Typically, the transmission distance of a transmission medium for digital signals, such as a video graphics array (VGA) cable or a network cable may be equal to or smaller than 100 meters. A digital signal may need to be compressed for long-distance transmission, which may result in a transmission delay. The transmission distance of a transmission medium for analog signals may be about 300 meters, or even about 500 meters.

In some embodiments, the format information encoded in the blanking zone and/or audio signal(s) in the active zone may not be converted into analog signals. The format information and/or the audio signal(s) may have a much smaller size than the video signal(s) in the active zone. For example, the size of the blanking zone for encoding the format information may be smaller than 10 bytes. The size of the audio signal(s) may be 8 bytes or 16 bytes. The small sized format information and/or audio signals, even being of digital signals, can be transmitted for a long distance at a low transmission speed. The low transmission speed may refer to a transmission speed smaller than a threshold speed (e.g., 9600 bps, 1 kps, 1.17 kps, or 10 kps).

In 440, the transmission module 340 may transmit the composite multimedia signal to a receiving device via a transmission medium.

The transmission medium may include any transmission medium that can transmit analog signals and digital signals, such as a coaxial cable, a twisted pair cable, an optical fiber, or the like, or any combination thereof.

In order to ensure the transmission of the composite multimedia signal, the maximum transmission bandwidth supported by the transmission medium may be equal to or greater than a required transmission bandwidth of the composite multimedia signal. For example, if the composite multimedia signal is generated based on two multimedia signals each of which requires a transmission bandwidth bw_s for transmission, the maximum transmission bandwidth supported by the transmission medium may have to be equal to or greater than 2*bw_s.

In some embodiments, after the receiving device receives the composite multimedia signal, the analog signals of the composite multimedia signal may be converted into digital signals. The conversion may be implemented by an analog-to digital-converter (ADC) or any other device for analog-to-digital conversion. In some embodiments, the converted composite multimedia signal may be same as or substantially similar to the composite multimedia digital signal as described in connection with operation 420. In some embodiments, the receiving device may further demodulate the converted composite multimedia signal, and transmit the demodulated signal to one or more output devices. Details regarding the processing of the composite multimedia signal may be found elsewhere in the present disclosure (e.g., FIG. 6 and the relevant descriptions thereof).

It should be noted that the above description regarding the process 400A is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations may be added in the process 400A or one or more operations in the process 400A may be omitted.

In some embodiment, the multimedia signals received in 410 may include valid data (e.g., video signals and/or audio signals) as well as other data (e.g., blanking zones, blanking lines). The processing engine 112 may extract the valid data from multimedia signals and then generate the composite multimedia digital signal based on the valid data. In some embodiments, each of the multimedia signals may include one or more horizontal synchronization signals and/or one or more frame synchronization signals. A horizontal synchronization signal may indicate a start of an active line. A frame synchronization signal may indicate a start of a frame. In some embodiments, before encoding the multimedia signals, the processing engine 112 may detect the horizontal synchronization signal(s) and/or the frame synchronization signal(s) in each multimedia signal. The processing engine 112 may then extract valid data from the multimedia signals based on the detected horizontal synchronization signal and/or frame synchronization signal in each multimedia signal. For example, the valid data may include data (e.g., audio signals and/or video signals) encoded between two adjacent horizontal synchronization signals or two adjacent frame synchronization signals. The processing engine 112 may further generate the composite multimedia digital signal by coding the valid data in the frame format as described in connection with operation 420. The coding of the valid data may be similar to that of multimedia signals, and the descriptions thereof are not repeated here.

In some embodiments, the multimedia signals received in operation 410 may include one or more modulated multimedia signals and/or one or more unmodulated multimedia signals. In operation 420, the generation module 320 may directly generate the composite multimedia digital signal by coding the one or more modulated multimedia signals and/or one or more unmodulated multimedia signals. Alternatively, in operation 420, the generation module 320 may modulate the unmodulated multimedia signal(s), and generate the composite multimedia signal based on the modulated multimedia signal(s) and the original modulated multimedia signal(s) (if any).

In some embodiments, the conversion module 330 may compress a portion or all of the composite multimedia signal before transmitting the composite multimedia signal to the receiving device. For example, the conversion module 330 may compressed audio signals in the composite multimedia signal according to various audio compressing techniques. As another example, the conversion module 330 may compressed video signals in the composite multimedia signal according to various video compressing techniques. The receiving device may decompress the compressed portion in the composite multimedia signal after receiving the composite multimedia signal.

Figure 4B:
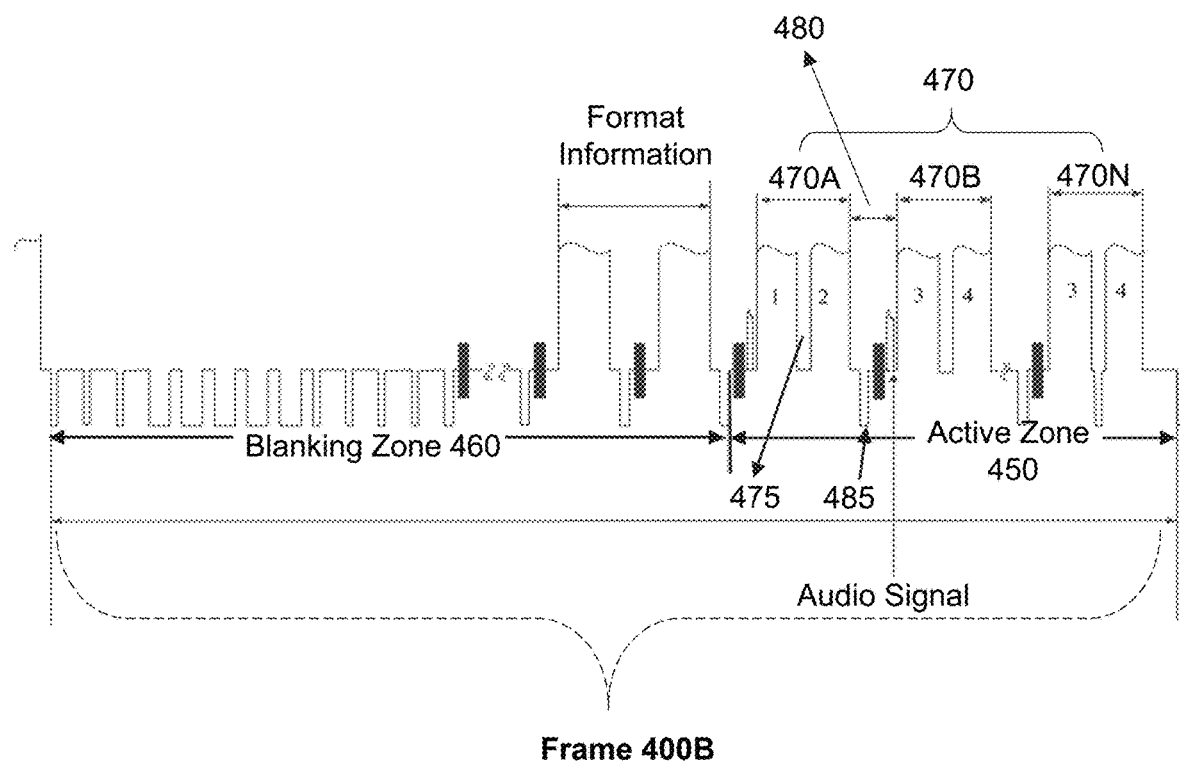
FIG. 4B is a schematic diagram illustrating an exemplary frame format of a frame of a composite multimedia digital signal according to some embodiments of the present disclosure.

FIG. 4B is a schematic diagram illustrating an exemplary frame format of a frame 400B of a composite multimedia digital signal according to some embodiments of the present disclosure. The composite multimedia digital signal may be generated based on a plurality of multimedia signals received from a plurality of channels by performing operations 410 and 420 as described in connection with FIG. 4A.

As shown in FIG. 4B, the frame format of the frame 400B may include an active zone 450 and a blanking zone 460. The active zone 450 may be used to encode at least part of the multimedia signals based on which the composite multimedia digital signal is generated. The blanking zone 460 may be used to encode format information. In some embodiments, the format information may be related to the format of the frame 400B, the active zone 450, and/or the blanking zone 460. The format information related to the format of the frame may include the duration of the frame, the size of the frame, or the like. The format information related to the format of the active zone may include the duration of the active zone, the size of the active zone, the number of active lines in the active zone, the number of horizontal blanking zones in the active zone, the coding form of the multimedia signals in the active zone, or the like, or any combination thereof. In some embodiments, the format information may be encoded at any position of the blanking zone 460. Merely by way of example, as shown in FIG. 4B, the format information may be encoded in a portion of the blanking zone 460 (e.g., two blanking lines of the blanking zone 460) adjacent to the active zone 450. In some embodiments, the size of the blanking zone 460 may be equal to or smaller than a threshold size. The threshold size may have any positive value, such as 6 bytes, 8 bytes, 10 bytes, 20 bytes, 100 bytes, or the like. In some embodiments, the threshold size may be 10 bytes.

The active zone 450 may include a plurality of active lines 470 (e.g., active lines 470A to 470N). The number of the active lines 470 may be any positive value. The number of the active lines 470 may be a preset parameter or be adjusted according to different application scenarios. In some embodiments, the number of the active lines 470 may be determined based on the size of the composite multimedia digital signal. The size of the composite multimedia digital signal may be related to, for example, the resolution of the video signals that form the composite multimedia digital signal. For example, if the composite multimedia digital signal is generated based on four 720p video signals whose resolutions are all 1280*720, the resolution of the composite multimedia digital signal may be 2560*1440. In that case, the number of active lines 470 may be equal to or greater than 1440.

In some embodiments, at least one of the multimedia signals may include a video signal. The video signal may be encoded in one or more of the active lines 470. In some embodiments, two or more of the multimedia signals may include a video signal. The video signals may form one or more combinations of video signals each of which is encoded in one or more active lines 470. For brevity, a combination of video signals may be referred to as a video combination. The video combination encoded in different active lines 470 may be the same or different. For example, as illustrated in FIG. 4B, video signals 1, 2, 3, and 4 are encoded in the active zone 450. A combination of the video signals 1 and 2 is encoded in the active line 470A. A combination of the video signals 3 and 4 is encoded in both the active line 470B and the active line 470N. It should be noted that the example illustrated in FIG. 4B is merely provided for illustration purposes. The video signals 1 to 4 may be encoded in the active lines 470 in any combination form. In some embodiments, an active lines 470 may only encode one of the video signals 1 to 4.

In some embodiments, a separator 475 may be inserted in an active line 470 between a pair of adjacent video signals to distinguish the two adjacent video signals. For example, as illustrated in FIG. 4B, the separator 475 may be inserted between the video signals 1 and 2 in the active line 470A. In some embodiments, to generate the composite multimedia digital signal in the frame format, the processing engine 112 (e.g., the generation module 320) may encode the video signals into the active lines 470 according to the format information in the blanking zone 460. Then the processing engine 112 may inserting one or more separators 475 between one or more pair of adjacent video signals in at least one active line 470.

The active zone 450 may also include one or more horizontal blanking zones 480. Each of the horizontal blanking zone(s) 480 may be located between a pair of adjacent active lines 470. In some embodiments, the active zone 450 may include a horizontal blanking zone 480 between each pair of active lines 470. Optionally, the active zone 450 may further include an extra horizontal blanking zone 480 corresponding to the first active line 470 or the last active line 470. In that case, the number of the active lines 470 may be equal to that of the horizontal blanking zones 480. Each active line 470 may have a corresponding horizontal blanking zone 480 that is adjacent to it.

In some embodiments, each of the horizontal blanking zone(s) 480 may include a horizontal synchronization signal 485 configured to indicate the start of an active line 470. In order to distinguish the separator 475 and the horizontal synchronization signal 485, the separator 475 and the horizontal synchronization signal 485 may be assigned with different time widths. Merely by way of example, the time width of the separator 475 may be equal to the half of the time width of the horizontal synchronization signal 485.

In some embodiments, one or more of the multimedia signals may include an audio signal. In the generation of the composite multimedia digital signal, the processing engine 112 may encode the audio signal(s) into one or more horizontal blanking zones 480. Different horizontal blanking zones 480 may encode the same audio signal(s) or different audio signals. In some embodiments, the audio signal(s) may be encoded into all or a portion of the horizontal blanking zone(s) 480 of the frame 400B. In some embodiments, each audio signal of the multimedia signals may be encoded in one horizontal blanking zone 480, respectively. For example, if the number of the audio signal(s) is M, M active lines 470 and their corresponding horizontal blanking zones 480 may be designated as a cycle. Each horizontal blanking zone 480 in the cycle may encode an audio single of the M audio signal(s). Different horizontal blanking zones 480 in the cycle may encode different audio signals.

In some embodiments, each of the multimedia signals may include a video signal and a corresponding audio signal. The video signals may form one or more video combinations each of which is encoded in one or more active lines 470. The audio signals may also form one or more combinations of audio signals each of which is encoded in one or more horizontal blanking zones 480. For brevity, a combination of audio signals may be referred to as an audio combination. In some embodiments, the audio combination(s) may be formed according to the video combination(s). Merely by way of example, for an active line 470, the processing engine 112 may determine an audio combination according to the video combination in the active line 470. The audio combination may include audio signals that correspond to the video signals in the video combination. The processing engine 112 may then encode the audio combination into the horizontal blanking zone 480 corresponding to the active line 470. Take the combination of video signals 1 and 2 in the active lines 470A as an example, the processing engine 112 may determine an audio combination corresponding to the combination of video signal 1 and 2. The audio combination may include an audio signal corresponding to the video signal 1 and an audio signal corresponding to the video signal 2. The audio combination may be encoded into a horizontal blanking zone 480 corresponding to the active line 470A (e.g., the horizontal blanking zone 480 between the active lines 470A and 470B).

In some embodiments, the size of a horizontal blanking zone 480 may vary depending on the amount of audio signals encoded in the horizontal blanking zone 480. For example, a horizontal blanking zone 480 encoding fewer audio signals may have a relative smaller size than that encoding more audio signals. As another example, if the video signals in an active line A have more corresponding audio signals than that of an active line B, the horizontal blanking zone 480 corresponding the active line A may have a relative larger size than the horizontal blanking zone 480 corresponding to the active line B. As such, the horizontal blanking zone(s) 480 may satisfy the loading requirement of audio signals, and at the same time, the bandwidth utilization may be increased.

In some embodiments, the format of the active zone 450 may be indicated and/or prescribed by the format information encoded in the blanking zone 460. For example, two or more of the multimedia signals may include a video signal. The format information in the blanking zone 460 may indicate a combination form of the video signals in the active lines 470. The combination form may include a combination of the video signals encoded in each active line 470. As another example, two or more of the multimedia signal may include an audio signal. The format information in the blanking zone 460 may indicate a combination form of the audio signals in one or more horizontal blanking zones 480. For illustration purposes, an example of format information regarding the active zone 450 encoded in the blanking zone 460 is illustrated in Table. 1 below:

TABLE 1

An example of format information regarding the active zone 450

| Header | M | ID-0 | ID-1 | SPR | ID-3 | ID-4 | ... | SPR | ID-(M-1) | ID-M | CRC |
|---|---|---|---|---|---|---|---|---|---|---|---| where "Header" refers to a code header; "M" denotes the total number of the video signals; "ID-0", "ID-1", . . . , and "ID-M" respectively refers to a video signal; "CRC" refers to a cyclic redundancy check code; and "SPR" refers a separator between two adjacent active lines 470 configured to distinguish the adjacent active lines 470. For example, Table. 1 shows that a combination of video signals ID-0 and ID-1, a combination of video signal ID-3 and ID-4, and a combination of video signals ID-(M−1) and ID-M are encoded in an active line 470, respectively. In some embodiments, the "SPR" may include a horizontal synchronization signal 485.

It should be noted that the above description of the frame 400B of the composite multimedia signal is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the active zone 470 may encode any type of multimedia signals other than video signals and audio signals, such as an image signal, an animation signal, or the like, or any combination thereof. In some embodiments, the multimedia signals may be encoded in the active line 470 in any combination form.

In some embodiments, key information contained in or related to the multimedia signals may be detected, and the frame format of the composite multimedia digital signal generated based on the multimedia signals may be adjusted upon the detection of the key information. The key information may include any object (e.g., a human, a human face, a vehicle, smoke, fire) and/or event (e.g., a motion of human) that a user may be interested in. The key information may be detected by the acquisition device(s) 130 of the multimedia signals and/or the processing engine 112 by analyzing the multimedia signals. Additionally or alternatively, the key information may be detected by another component of the multimedia system 100, such as a smoke detector, a thermometer, and/or a flame detector installed near or in the acquisition device(s) 130. In some embodiments, the generation module 320 may insert a signal (e.g., an alarm signal) corresponding to the key information in the composite multimedia digital signal to indicate the existence of the key information. For example, the signal corresponding to the key information may be inserted into a blanking zone 460 or a horizontal blanking zone 480 of a frame in which the key information is included. In some embodiments, the processing engine 112 may adjust the sizes of different frames or the resolutions of different multimedia signals in the composite multimedia digital signal in response to the detection of the key information. Merely by way of example, if a certain multimedia signal is determined to contain key information in a certain frame, the frame that encodes the certain multimedia signal may be adjusted to have a larger size to support a higher resolution for the multimedia signal.

Figure 5:
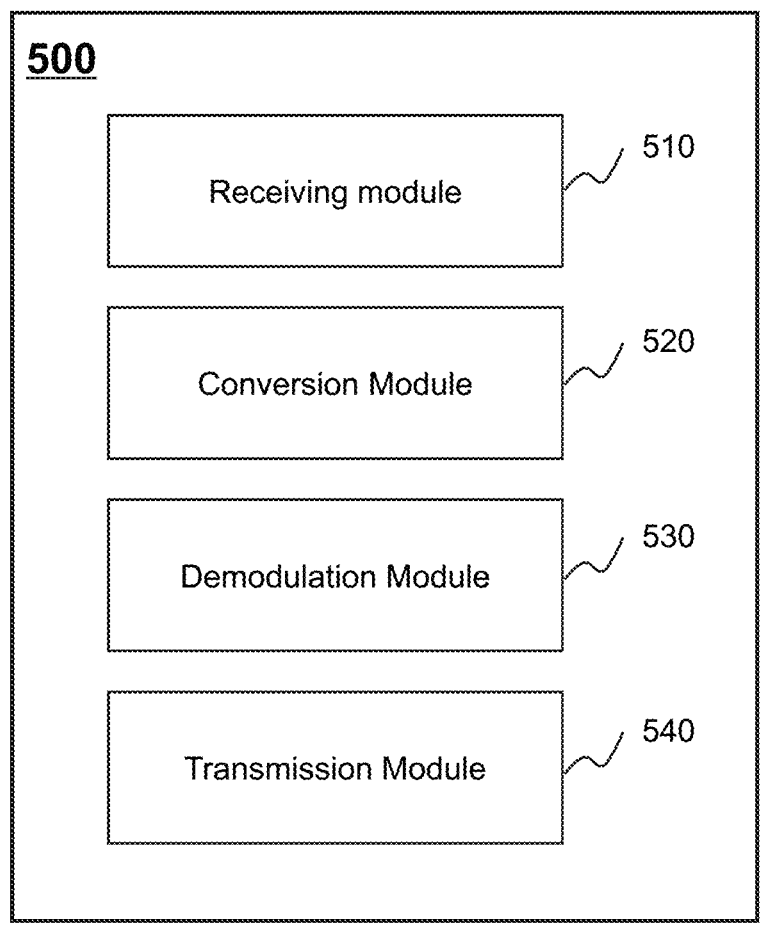
FIG. 5 is a block diagram illustrating an exemplary receiving device according to some embodiments of the present disclosure.

FIG. 5 is a block diagram illustrating an exemplary receiving device 500 according to some embodiments of the present disclosure. The receiving device 500 may include a receiving module 510, a conversion module 520, a demodulation module 530, and a transmission module 540.

The receiving module 510 may be configured to receive information related to the multimedia system 100. For example, the receiving module 510 may receive a composite multimedia signal in a frame format. The composite multimedia signal be generated based on at least two multimedia signals received from a plurality of channels. The frame format may include an active zone and a blanking zone. The active zone may be configured to encode analog signals, which are converted from at least part of the multimedia signals. The blanking zone may be configured to encode format information. Details regarding the composite multimedia signal may be found elsewhere in the present disclosure (e.g., operation 430 in FIG. 4, operation 610 in FIG. 6 and the relevant descriptions thereof).

The conversion module 520 may be configured to convert the analog signals in the active zone of the composite multimedia signal into digital signals. The converted composite multimedia signal may be a digital signal and referred to as a composite multimedia digital signal. In some embodiments, the conversion module 520 may instruct an analog-to-digital converter (ADC) or any other device for analog-to-digital conversion to perform the analog-to-digital conversion.

The demodulation module 530 may be configured to demodulate the composite multimedia digital signal according to the format information encoded in the blanking zone. In the demodulation, the demodulation module 530 may extract valid information (i.e., the demodulated composite multimedia digital signal) from a carrier wave. Additionally or alternatively, the demodulation module 530 may determine the structure and components of the demodulated composite multimedia digital signal according to the format information. For example, the demodulation module 530 may extract the multimedia signals encoded in the composite multimedia digital signal according to the format information. Details regarding the demodulation of the composite multimedia digital signal may be found elsewhere in the present disclosure (e.g., operation 630 in FIG. 6 and the relevant descriptions thereof).

The transmission module 540 may be configured to transmit the demodulated composite multimedia digital signal. For example, the transmission module 540 may transmit the demodulated composite multimedia digital signal to one or more output devices 140. In some embodiments, the demodulation module 530 may extract the multimedia signals encoded in the composite multimedia digital signal, and the transmission module 540 may transmit each multimedia signal to a distinctive output device 140. In some embodiments, the transmission module 540 may transmit two or more of the multimedia signals to the same output device 140.

It should be noted that the above descriptions of the receiving device 500 are merely provided for the purposes of illustration, and not intended to limit the scope of the present disclosure. For persons having ordinary skills in the art, various modifications and changes in the forms and details of the application of the above method and system may occur without departing from the principles of the present disclosure. For example, the conversion module 520 and the demodulation module 530 may be integrated into a module to convert and demodulate the composite multimedia signal. However, those variations and modifications also fall within the scope of the present disclosure.

FIG. 6 is a flowchart illustrating an exemplary process 600 for processing a composite multimedia signal according to some embodiments of the present disclosure. In some embodiments, one or more operations in the process 600 may be implemented in the multimedia system 100 illustrated in FIG. 1. In some embodiments, one or more operations in the process 600 may be stored in a storage device (e.g., the storage device 120, the storage 220) as a form of instructions, and invoked and/or executed by the server 110 (e.g., the processing engine 112 of the server 110, or the processor 210 of the computing device 200) or a receiving device 500 of the composite multimedia signal. For illustration purposes, an implementation of the process 600 on the receiving device 500 is described as an example.

In 610, the receiving module 510 may receive a composite multimedia signal in a frame format.

In some embodiments, the composite multimedia signal may be generated based on at least two multimedia signals received from a plurality of channels. The at least two multimedia signals may also be referred to as multimedia signals for brevity. The multimedia signals may include a video signal, an audio signal, a text signal, an image signal, or the like, or any combination thereof. In some embodiments, a channel may correspond to an acquisition device an acquisition component of the acquisition device 130 from which a multimedia signal is received. The multimedia signals may be substantially similar to the multimedia signals described in connection with operation 410, and the descriptions thereof are not repeated here.

The composite multimedia signal in the frame format may include one or more frames. The frame format of a frame may include an active zone and a blanking zone. The blanking zone may be configured to encode format information. The format information may include format information related to the format of the frame, the active zone, and/or the blanking zone. In some embodiments, a portion or all of the multimedia signals may be converted into analog signals in the generation of the composite multimedia signal. The active zone may be configured to encode the analog signals converted from the portion or all of the multimedia signals. Optionally, a portion of the multimedia signals may not be converted into analog signals in the generation of the composite multimedia signal. The active zone may be further configured to encode the unconverted part of the multimedia signals. For example, each of the multimedia signals may include a video signal and an audio signal. The video signals may be converted into analog signals. The audio signals and the analog signals converted from the video signals may be encoded in the active zone. In some embodiments, the composite multimedia signal may be generated based on the multimedia signals by performing operations 410 to 430 as described in connection with FIG. 4.

In 620, the conversion module 520 may convert the analog signals in the active zone into digital signals. The converted composite multimedia signal may be a digital signal and referred to as a composite multimedia digital signal. The format of the composite multimedia digital signal may be similar to that described in operation 420, and the descriptions thereof are not repeated. In some embodiments, the conversion module 520 may instruct an analog-to-digital converter (ADC) or any other device for analog-to-digital conversion to perform the analog-to-digital conversion.

In 630, the demodulation module 530 may demodulate the composite multimedia digital signal according to the format information encoded in the blanking zone. In the demodulation, the demodulation module 530 may extract valid information (i.e., the demodulated composite multimedia digital signal) from a carrier wave.

In some embodiments, the demodulation module 530 may determine the structure and components of the demodulated composite multimedia digital signal according to the format information. For example, as described in connection with FIG. 4B, the format information may indicate a combination form of video signals in the active lines of the active zone. The demodulation module 530 may determine the video signals encoded in the active lines based on the format information. Optionally, the demodulation module 530 may further extract the video signals in an active line according to the separator(s) between one or more pair of adjacent video signals in the active line. As another example, the format information may indicate a coding form of audio signals in the horizontal blanking zone(s) of the active zone. The demodulation module 530 may determine and extract the audio signals based on the format information.

In some embodiments, the demodulation module 530 may determine one or more parameters related to the multimedia signals, such as the brightness, the chromaticity, or the like in the signal demodulation.

In 640, the transmission module 540 may transmit the demodulated composite multimedia digital signal to one or more output devices 140.

Exemplary output device 140 may include a mobile device 140-1, a computer 140-2, a display device 140-3, a loudspeaker 140-4, a headset, a microphone, a music player, an e-book reader, a printer, a projector, or the like, or a combination thereof. In some embodiments, the demodulation module 530 may extract the multimedia signals in the demodulated composite multimedia digital signal as described in connection with operation 630. The transmission module 540 may transmit each multimedia signal to a suitable output device 140. For example, the transmission module 540 may transmit an audio signal to an audio output device. In some embodiments, the transmission module 540 may transmit each multimedia signal to a distinctive output device 140. In some embodiments, the transmission module 540 may transmit two or more of the multimedia signals to a same output device 140.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the receiving device may include one or more output components. Additionally or alternatively, the output device(s) 140 may be integrated into the receiving device, for example, as one or more output components. The receiving device may process the composite multimedia signal to extract the multimedia signals, and output at least part of the multimedia signals by itself.

In some embodiments, the receiving device may transmit a control signal to one or more acquisition devices that acquire the multimedia signals. The control signal may control the acquisition device(s) to perform a certain action, for example, to take a picture, rotate, or stop operating. In some embodiments, when receiving the composite multimedia signal, the receiving device may determine whether currently received data is encoded in the blanking zone of the composite multimedia signal. Upon a determination that the currently received data is encoded in the blanking zone, the receiving device may transmit the control signal to the one or more acquisition device(s). More Descriptions regarding the transmission of the control signal to the acquisition device(s) may be found in, for example, International Application No. PCT/CN2018/111361, entitled "SYSTEMS AND METHODS FOR MULTIMEDIA SIGNAL PROCESSING AND TRANSMISSION," filed on even date, the contents of which are hereby incorporated by reference.

Figure 7:
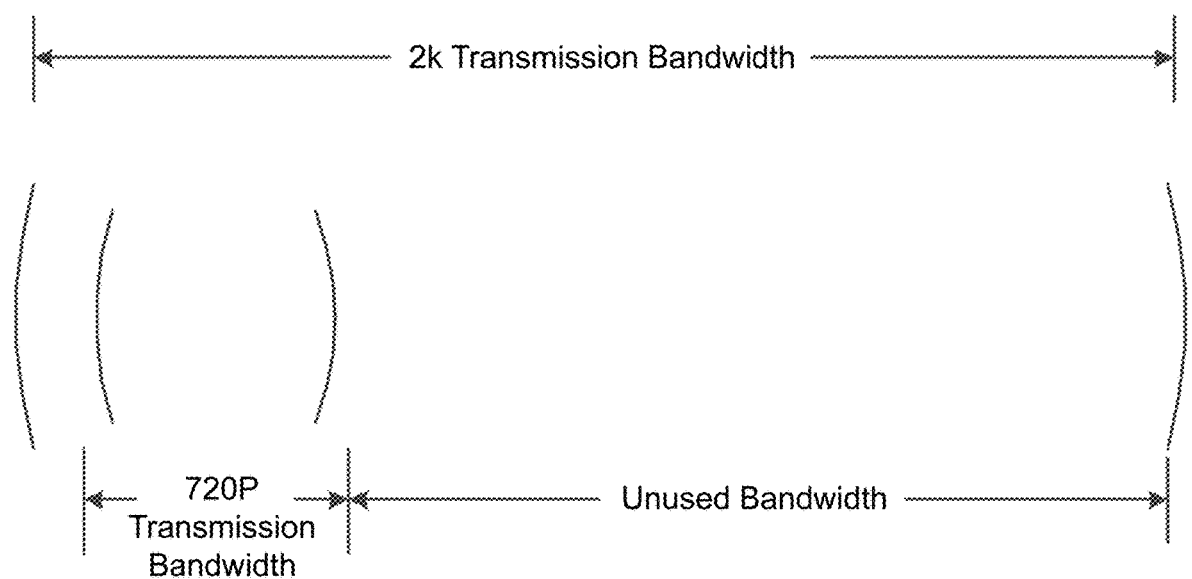
FIGS. 7 and 8 are schematic diagrams illustrating exemplary traditional ways of transmitting video signals.
Figure 8:
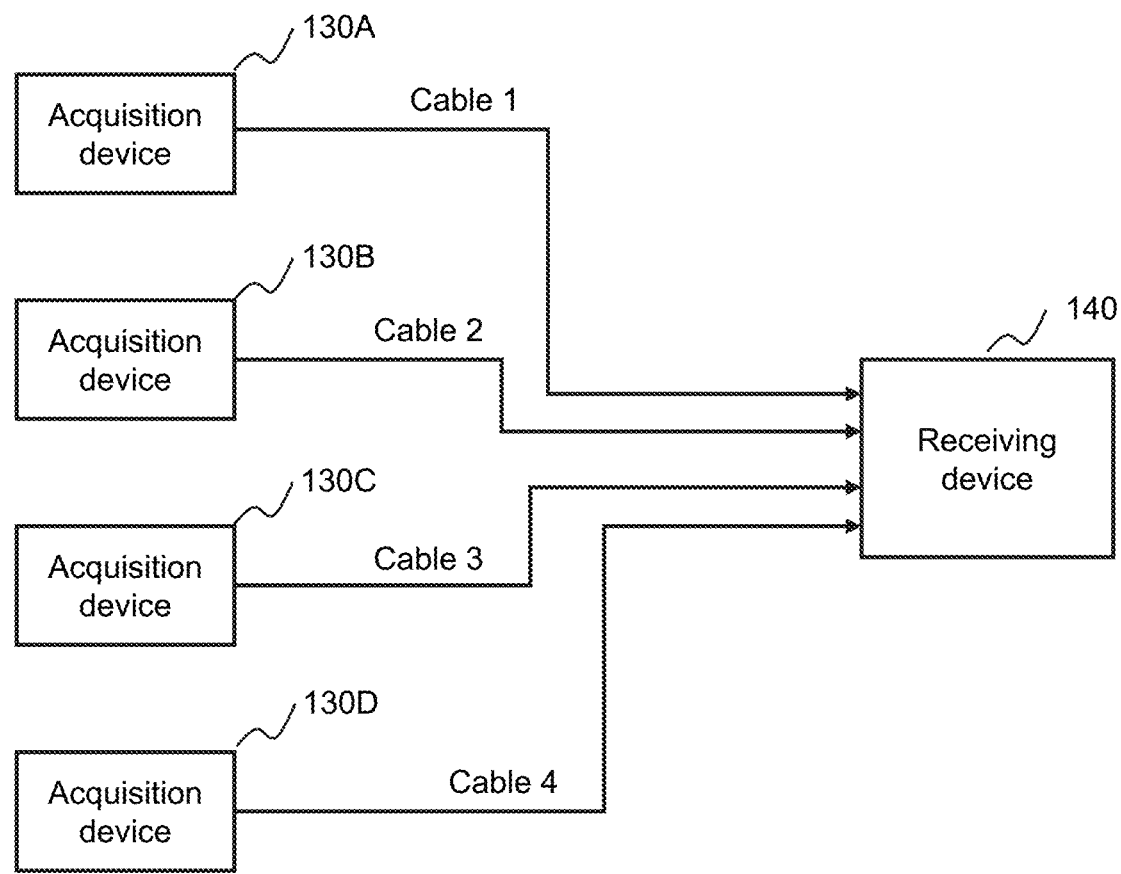

FIGS. 7 and 8 are schematic diagrams illustrating exemplary traditional ways of transmitting video signals.

In the field of video surveillance, a video signal (e.g., an analogy video signal) is typically transmitted through a transmission medium with a transmission bandwidth of 2 k. When transmitting a plurality of video signals acquired from a plurality of channels, each video signal may need a transmission medium with 2 k transmission bandwidth, which may result in a waste of transmission recourses. For example, as illustrated in FIG. 7, a 720p video signal may only use a portion of the total 2 k transmission bandwidth, leaving the rest of the transmission bandwidth unused. As another example, as shown in FIG. 8, each of the video signals acquired by the plurality of acquisition devices (e.g., acquisition devices 130A, 130B, 130C, and 130D) may be transmitted to a receiving device via a single transmission medium (e.g., a cable), respectively. As yet another example, a single channel video signal may be generated by stitching the video signals. The single channel video signal may then be compressed into bit streams using a video compression technique such as H.264. The bit streams may be sent to the receiving device via a wireless network. The receiving device may decompress the bit streams and process the decompressed bit streams, and further transmit the decompressed bit streams to an output device 140 (e.g., a display) for display. The compression of the single channel video signal may take time and reduce the video quality.

Figure 9:
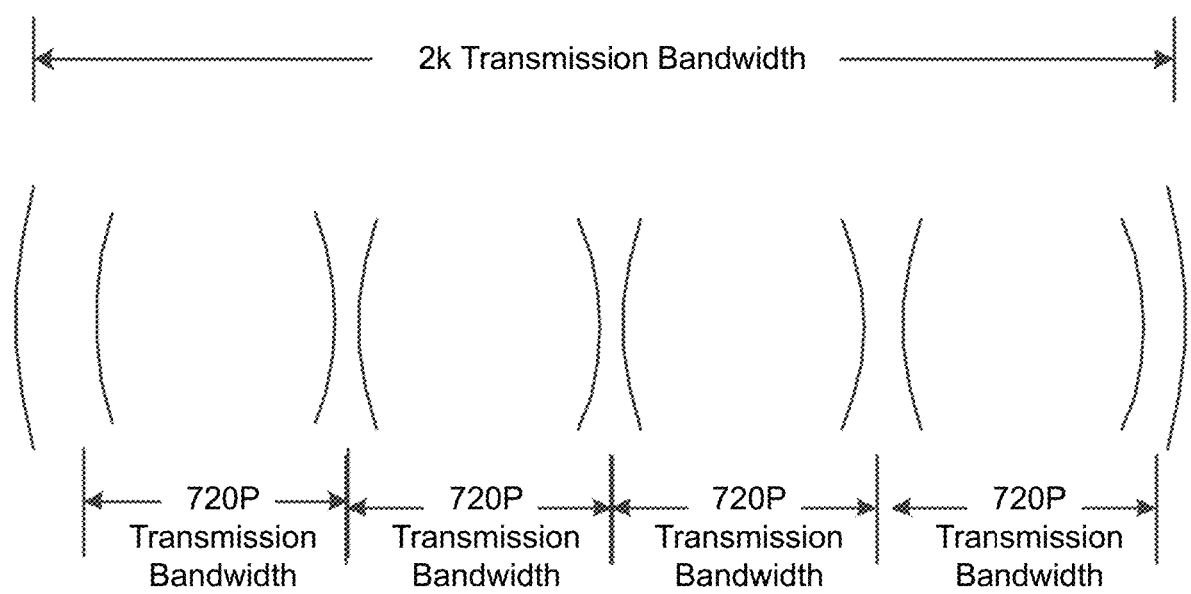
FIGS. 9 and 10 are schematic diagrams illustrating exemplary ways of transmitting video signals according to some embodiments of the present disclosure.
Figure 10:
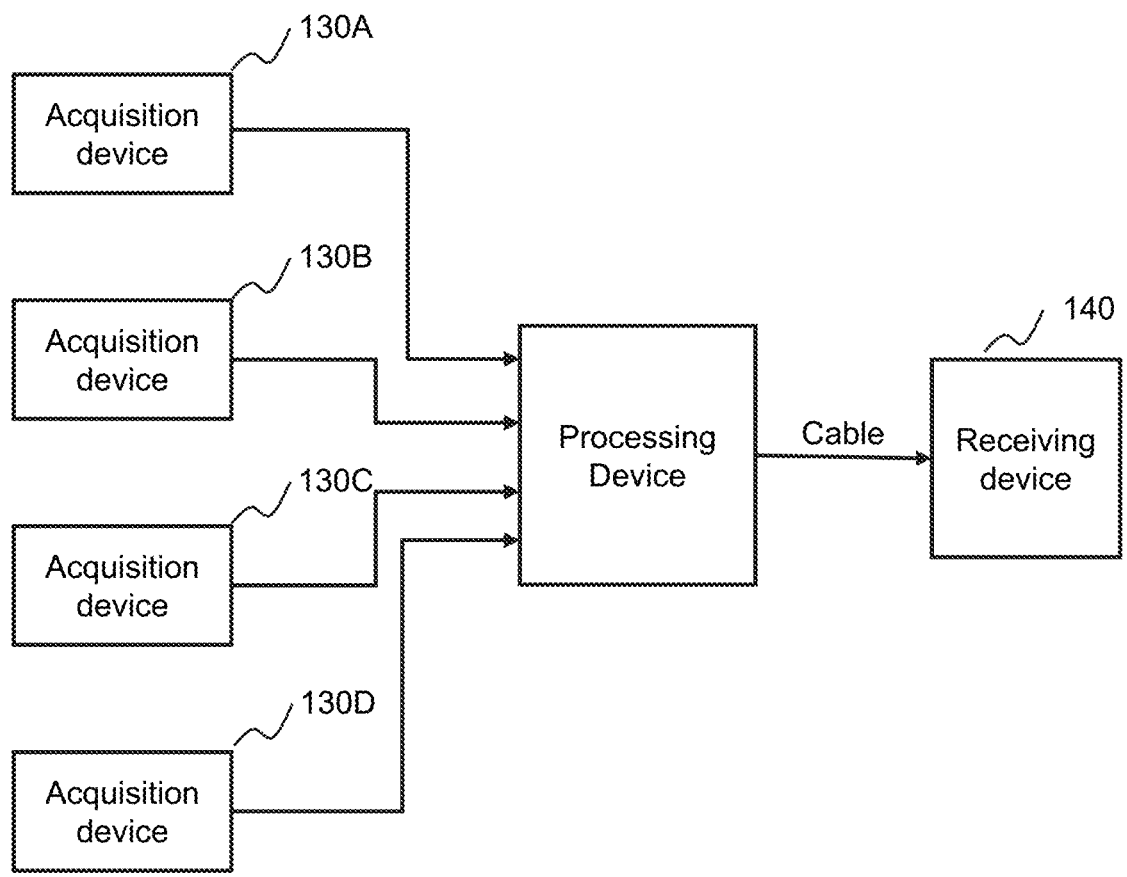

FIGS. 9 and 10 are schematic diagrams illustrating exemplary ways of transmitting video signals according to some embodiments of the present disclosure.

When transmitting a plurality of video signals acquired from a plurality channels, a composite video signal or a composite digital video signal (collectively referred to as a composite video signal hereinafter) may be generated based on the plurality of video signals. In some embodiments, the composite video signal may be generated by performing the methods for generating a composite multimedia signal disclosed in the present disclosure (e.g., the process 400A). The composite video signal may be transmitted via a single transmission medium. For example, as shown in FIG. 9, a transmission medium with 2 k transmission bandwidth may be used to transmit a composite video signal generated based on four 720p video signals. The transmission bandwidth of the transmission medium may be fully used. As another example, as shown in FIG. 10, the video signals acquired by the plurality of acquisition devices (e.g., acquisition devices 130A, 130B, 130C, and 130D) may be transmitted to a processing device (e.g., the processing engine 112) for processing. The processing device may generate a composite video signal by coding the video signals. The composite video signal may be transmitted to a receiving device via a single cable.

Compared with the traditional ways of transmitting video signals as described in connection with FIGS. 7 and 8, the ways of transmitting video signals disclosed in the present discourse may improve the transmission efficiency and reduce the transmission cost. In addition, the video signals may not need to be compressed or transmitted via a wireless network, which may ensure the video quality, the synchronous transmission, and the real-time transmission.

Figure 11:
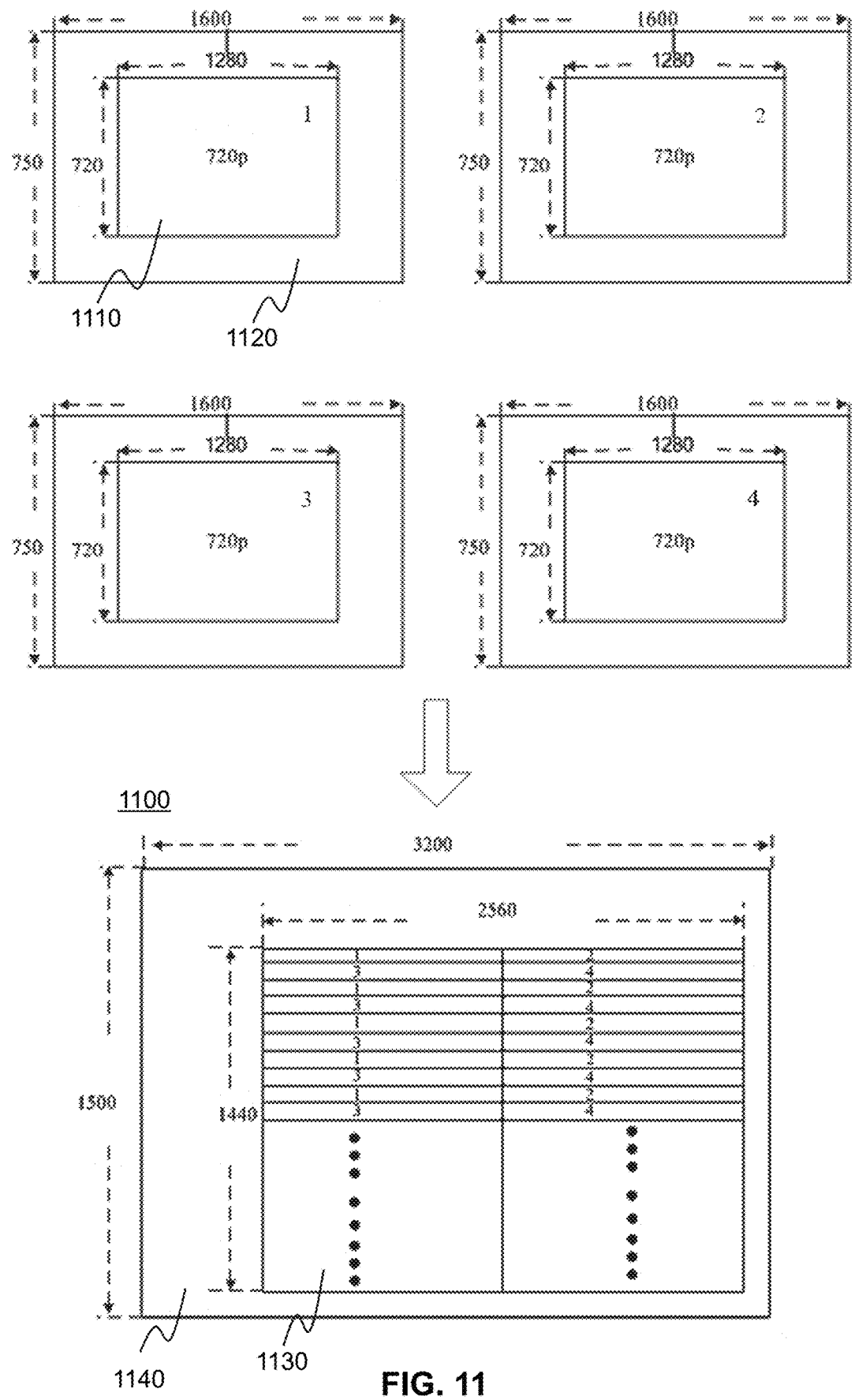
FIG. 11 is a schematic diagram illustrating an exemplary process of generating a composite video signal according to some embodiments of the present disclosure.

FIG. 11 is a schematic diagram illustrating an exemplary process of generating a composite video signal 1100 according to some embodiments of the present disclosure.

The composite video signal 1100 may be generated based on four 720p video signals (denoted as video signal 1, 2, 3, and 4) acquired from four channels. Each video signal may include 750 lines per frame and 1600 sample periods (e.g., luma sample periods) in each line. The video signal may include an active zone 1110 and a blanking zone 1120. The active zone 1110 may include 720 active lines and 1280 samples (e.g., luma samples or RGB samples) in each active line.

In some embodiments, the composite video signal 1100 may be generated by coding the video signals in a frame format by performing the methods for generating a composite multimedia signal disclosed in the present disclosure (e.g., the process 400A). The composite video signal 1100 may include 1500 total lines per frame and 3200 sample periods (e.g., luma sample periods) in each line. The composite video signal 1100 may include an active zone 1130 and a blanking zone 1140. The active zone may include 1440 active lines and 2560 samples (e.g., luma samples or RGB samples) in each active line. The video signals 1 to 4 may be combined into one or more video combinations, which may be encoded in one or more active lines of the active zone 1130. For example, as illustrated in FIG. 11, a combination of the video signals 1 and 2 may be encoded in the first, third, fifth, seventh, and ninth active lines. A combination of the video signals 3 and 4 may be encoded in the second, fourth, sixth, eighth, and tenth active lines. The blanking zone 1140 may be similar to the blanking zone 460 as described in connection with FIG. 4B, and the descriptions thereof are not repeated.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method implemented on a computing device having at least one processor and at least one non-transitory computer-readable storage medium, comprising:
   receiving at least two multimedia signals from a plurality of channels, wherein at least one of the at least two multimedia signals includes a video signal;
   generating a composite multimedia digital signal by coding the at least two multimedia signals in a frame format, the frame format including an active zone and a blanking zone, the active zone being configured to encode at least part of the at least two multimedia signals, and the blanking zone being configured to encode format information, the size of the blanking zone of the frame format being smaller than 10 bytes;
   converting at least part of the encoded multimedia signals in the active zone into analog signals to generate a composite multimedia signal; and
   transmitting the composite multimedia signal to a receiving device via a transmission medium.

2. The method of claim 1, wherein the active zone is configured to encode the video signal, and the converting the at least part of the encoded multimedia signals in the active zone into analog signals further comprises:
   converting the video signal in the active zone into analog signals.

3. The method of claim 1, wherein the active zone of the frame format includes:
   a plurality of active lines configured to encode the video signal, and
   a horizontal blanking zone between at least one pair of adjacent active lines of the plurality of active lines, the horizontal blanking zone including a horizontal synchronization signal.

4. The method of claim 3, wherein each of the at least two multimedia signals includes a video signal, and the format information indicates a combination form of the video signals in the plurality of active lines in the active zone.

5. The method of claim 4, wherein the generating the composite multimedia digital signal by coding the at least two multimedia signals in the frame format comprises:
   encoding the video signals into the plurality of active lines according to the format information; and
   inserting a separator between at least one pair of adjacent video signals in at least one of the plurality of active lines.

6. The method of claim 5, wherein the horizontal synchronization signal and the separator have different time widths.

7. The method of claim 4, wherein:
   the active zone includes the horizontal blanking zone corresponding to each of the plurality of active lines,
   each of the at least two multimedia signals includes an audio signal, and the generating the composite multimedia digital signal further comprises:
   for each of the plurality of active lines in the active zone,
      determining a combination of the audio signals according to the combination form of the video signals in the active line; and
      encoding the combination of the audio signals into the horizontal blanking zone corresponding to the active line.

8. The method of claim 3, wherein:
   at least one of the at least two multimedia signals includes an audio signal, and
   the generating the composite multimedia digital signal further comprises:
      encoding the audio signal into the horizontal blanking zone.

9. The method of claim 1, wherein the method further comprises:
   converting the analog signals of the composite multimedia signal into digital signals.

10. The method of claim 1, wherein:
    each of the at least two multimedia signals includes at least one of a horizontal synchronization signal or a frame synchronization signal, and
    the generating the composite multimedia digital signal by coding the at least two multimedia signals further comprises:
       detecting the at least one of the horizontal synchronization signal or the frame synchronization signal in each multimedia signal;
       extracting valid data from the at least two multimedia signals based on the detected at least one of the horizontal synchronization signal or the frame synchronization signal in each multimedia signal; and
       generating the composite multimedia digital signal by coding the valid data.

11. A method implemented on a computing device having at least one processor and at least one non-transitory computer-readable storage medium, comprising:
    receiving a composite multimedia signal in a frame format, the composite multimedia signal being generated based on at least two multimedia signals that are received from a plurality of channels, wherein at least one of the at least two multimedia signals includes a video signal, the frame format includes an active zone and a blanking zone, the active zone is configured to encode analog signals converted from at least part of the at least two multimedia signals, and the blanking zone is configured to encode format information, the size of the blanking zone of the frame format being smaller than 10 bytes;
demodulating the composite multimedia signal according to the format information; and
transmitting the demodulated composite multimedia signal to one or more output devices, wherein the demodulating the composite multimedia signal according to the format information comprises:
converting the analog signals in the active zone into digital signals.

12. The method of claim 11, wherein the transmitting the demodulated composite multimedia digital signal to one or more output devices further comprises:
determining the at least two multimedia signals from the demodulated composite multimedia signal; and
transmitting the at least two multimedia signals to at least two output devices, wherein each of the at least two multimedia signals is transmitted to one of the at least two output devices.

13. A system, for transmitting a composite multimedia signal, comprising:
a non-transitory computer-readable storage medium storing a set of instructions;
at least one processor in communication with the non-transitory computer-readable storage medium, wherein when executing the set of instructions, the at least one processor is configured to cause the system to:
receive at least two multimedia signals from a plurality of channels, wherein at least one of the at least two multimedia signals includes a video signal;
generate a composite multimedia digital signal by coding the at least two multimedia signals in a frame format, the frame format including an active zone and a blanking zone, the active zone being configured to encode at least part of the at least two multimedia signals, and the blanking zone being configured to encode format information, the size of the blanking zone of the frame format being smaller than 10 bytes;
convert at least part of the encoded multimedia signals in the active zone into analog signals to generate a composite multimedia signal; and
transmit the composite multimedia signal to a receiving device via a transmission medium.

14. The system of claim 13, wherein the active zone is configured to encode the video signal, and to convert the at least part of the encoded multimedia signals in the active zone into analog signals, the at least one processor is further configured to cause the system to:
convert the video signal in the active zone into analog signals.

15. The system of claim 13, wherein the active zone of the frame format includes:
a plurality of active lines configured to encode the video signal, and
a horizontal blanking zone between at least one pair of adjacent active lines of the plurality of active lines, the horizontal blanking zone including a horizontal synchronization signal.

16. The system of claim 15, wherein each of the at least two multimedia signals includes a video signal, and the format information indicates a combination form of the video signals in the plurality of active lines in the active zone.

17. The system of claim 16, wherein to generate the composite multimedia digital signal by coding the at least two multimedia signals in the frame format, the at least one processor is further configured to cause the system to:
encode the video signals into the plurality of active lines according to the format information; and
insert a separator between at least one pair of adjacent video signals in at least one of the plurality of active lines.

18. The system of claim 16, wherein:
the active zone includes the horizontal blanking zone corresponding to each of the plurality of active lines,
each of the at least two multimedia signals includes an audio signal, and
to generate the composite multimedia digital signal, the at least one processor is further configured to cause the system to:
for each of the plurality of active lines in the active zone,
determine a combination of the audio signals according to the combination form of the video signals in the active line; and
encode the combination of the audio signals into the horizontal blanking zone corresponding to the active line.

19. The system of claim 15, wherein:
at least one of the at least two multimedia signals includes an audio signal, and
to generate the composite multimedia digital signal, the at least one processor is further configured to cause the system to:
encode the audio signal into the horizontal blanking zone.

20. The method of claim 1, wherein the composite multimedia signal is a mixed signal of digital signals and the analog signals, the digital signals including the format information encoded in the blanking zone.

* * * * *